W. J. GAGNON.
CHAIN END COUPLING.
APPLICATION FILED NOV. 28, 1917.

1,259,388.

Patented Mar. 12, 1918.

Inventor:
William J. Gagnon
by Horroman Horrow Atty's.

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

CHAIN-END COUPLING.

1,259,388.

Specification of Letters Patent.  Patented Mar. 12, 1918.

Application filed November 28, 1917. Serial No. 204,416.

*To all whom it may concern:*

Be it known that I, WILLIAM J. GAGNON, a citizen of the United States of America, and residing at Bridgeport, in the county of Fairfield and State of Connecticut, have invented a certain new and useful Improvement in Chain-End Couplings, of which the following is a specification.

My invention relates to chain end couplings and particularly to a coupling for uniting the ends of bead chain lengths, the object of my invention being to provide a simple and inexpensive coupling device by which the chain ends may be united with a certain freedom of play.

Referring to the accompanying drawings.

Figure 1:
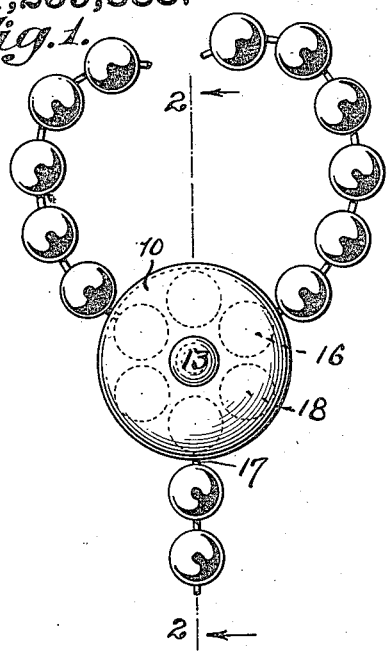
Figure 1 is an elevation of a coupling in which my invention is embodied in one form.

The present coupling is designed to afford a permanent connection between chain ends while at the same time permitting the latter to swivel in the coupling to prevent kinking of the chain during use. The construction shown in Figs. 1 and 2 comprises a pair of dished plates 10 and 11 spaced apart by an axial rivet 12, shouldered at each end to afford seats for the disks and permanently uniting the latter by spinning down the reduced ends of the rivet into heads 13 and 14 against the outer faces of the disks. The margins of the disks are spaced apart forming a slot 15. Before the disks are permanently secured together, the end balls 16 of the chain lengths to be united, are introduced between adjacent faces of the disks with their connecting links 17 passing through the slot 15. When the chain ends are thus positioned the two disks are united by spinning down the rivet heads 13 and 14, thus confining the end balls 16 within the chamber between the opposed faces of the disks, while the links 17 pass through the slot 15. The latter forms a freeway through which the links travel as the balls travel around in the chamber formed between the disks. The spacing of the disks 10 and 11 is of course predetermined with relation to the diameter of the balls so as to prevent the latter from binding, as is also the width of the slot 15 with relation to the links 17 to insure the free travel of the latter therethrough.

While the end balls 16 support the disks at various points, it may be advisable to insert free bearing balls 18 within the chamber of the coupling between the balls 16. They form reinforcing members which prevent deformation of the disks in case the coupling should be accidently stepped on or otherwise subjected to crushing pressure.

Figure 2:
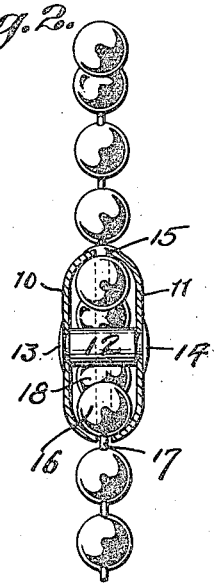
Fig. 2 is a section therethrough on the lines 2—2, Fig. 1.
Figure 3:
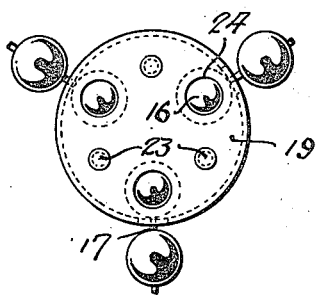
Fig. 3 is an elevation of a modified embodiment of my invention.
Figure 4:
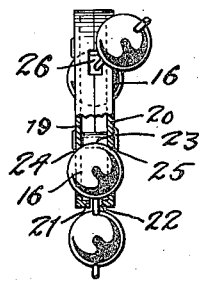
Fig. 4 is an edge view thereof partially in section.

In the modified construction shown in Figs. 3 and 4 the coupling comprises a pair of plates 19 and 20 with oppositely faced marginal flanges 21 and 22 which abut in the assembled coupling and are held together by a series of shouldered rivets 23 of the same type as that shown at 12 in Fig. 1. The disks are perforated in register at 24 and 25 by holes of less diameter than that of the end balls 16 so that the latter are engaged toward their mid-portion by the margins of the holes 24, 25, and held against escape while still permitting a limited amount of swiveling freedom. The marginal flanges 21 and 22 of the disks are cut away in register to form slots 26 through which project the links 17 connecting the chain to the end ball of the section. These slots 26 have an arcuate extent sufficient to permit a limited amount of angular movement of the chain section around the coupling. Inasmuch as the marginal flanges abut and the mid-portion of the coupling disks are supported by the end balls 16 and the shouldered rivets 23, there is no need for additional support.

Various modifications will readily occur to those skilled in the art which do not depart from what I claim as my invention.

In the following claims I use the expression "cupped disk" in a sense broad enough to cover a flat disk with marginal flange of the type shown in Figs. 3 and 4.

I claim:—

1. An end coupling for chains of the type having balls interconnected by links, said coupling comprising a pair of opposed cup disks, means for spacing apart the mid-portions of said disks to accommodate the end balls of chain sections and passage means between said disks through which the link connecting said end balls to the exterior portions of the chain sections may freely pass.

2. An end coupling for chains of the type having balls interconnected by links, said coupling comprising a pair of disks, shouldered rivets permanently uniting said disks together but spacing the same apart to accommodate the end balls of chain sections and marginal passage means between said disks to accommodate the links uniting said end balls to their adjacent sections of chain.

3. An end coupling for chains of the type having balls interconnected by links, said coupling comprising a pair of cupped disks, means permanently uniting said disks with their margins spaced apart, the end balls of chain sections being freely confined between said disks with connecting links freely passing through the slot afforded between the opposed margins of said disk, together with free bearing balls arranged between said disks and occupying the interspaces between said end balls of the chain sections.

In testimony whereof I have signed my name to this specification.

WILLIAM J. GAGNON.